United States Patent
Van der Walt et al.

(10) Patent No.: US 11,612,855 B2
(45) Date of Patent: Mar. 28, 2023

(54) PROCESSES, APPARATUSES, AND SYSTEMS FOR DIRECT AIR CARBON CAPTURE UTILIZING WASTE HEAT AND EXHAUST AIR

(71) Applicant: NEXT CARBON SOLUTIONS, LLC, Houston, TX (US)

(72) Inventors: Ivan Van der Walt, Conroe, TX (US); Ben Heichelbech, Houston, TX (US); Vikrum Subra, Houston, TX (US)

(73) Assignee: NEXT CARBON SOLUTIONS, LLC, Houston, TX (US)

( * ) Notice: Subject to any disclaimer, the term of this patent is extended or adjusted under 35 U.S.C. 154(b) by 0 days.

(21) Appl. No.: 17/683,541

(22) Filed: Mar. 1, 2022

(65) Prior Publication Data
US 2022/0305434 A1    Sep. 29, 2022

Related U.S. Application Data

(60) Provisional application No. 63/165,491, filed on Mar. 24, 2021.

(51) Int. Cl.
*B01D 53/04*      (2006.01)
*B01D 53/14*      (2006.01)
(Continued)

(52) U.S. Cl.
CPC ............. *B01D 53/22* (2013.01); *B01D 53/04* (2013.01); *B01D 53/1425* (2013.01);
(Continued)

(58) Field of Classification Search
CPC ......... Y02C 20/40; Y02E 20/00; Y02E 20/12; Y02E 20/14; Y02E 20/32; F17C 3/00; F17C 11/00; F17C 2221/015; F17C 2260/04; F17C 2265/04; F28D 1/0233; B01D 19/00; B01D 53/14; B01D 53/1418; B01D 53/1475; B01D 53/22; B01D 53/229;
(Continued)

(56) References Cited

U.S. PATENT DOCUMENTS

2004/0265199 A1 * 12/2004 MacKnight ........ B01D 53/1412
                                                             423/220

FOREIGN PATENT DOCUMENTS

| CN | 110 030 654 A | * | 7/2019 | ............. F24F 13/28 |
| JP | 2006 275 487 A | * | 10/2006 | ............. Y02A 50/20 |
| JP | 2017 206 145 A | * | 11/2017 | ............. Y02C 20/40 |
| WO | WO 2016 038 340 A1 | * | 3/2016 | ............. B01J 20/103 |
| WO | WO 2022 050 918 A1 | * | 3/2022 | ............. B01D 53/00 |

OTHER PUBLICATIONS

IEAGHG Technical Report by IEA, Techno-Economic Evaluation of CO2 Capture in LNG Plants, IEA Greenhouse Gas R&D Programme, Oct. 2019, 198 pages.
(Continued)

*Primary Examiner* — Timothy C Vanoy
(74) *Attorney, Agent, or Firm* — K&L Gates LLP

(57) ABSTRACT

Disclosed are processes, apparatuses, and systems for Direct Air Carbon Capture utilizing waste heat from gas turbines and exhaust air from air cooled heat exchangers, such as in industrial facilities with sources of heat and using fans. The exhaust air from the air cooled heat exchangers may be used to drive one or more fans in one or more Direct Air Carbon Capture units. The waste heat—thus no electricity needed—may be used to regenerate the catalyst(s) in the Direct Air Carbon Capture units.

19 Claims, 1 Drawing Sheet

(51) Int. Cl.
*B01D 53/22* (2006.01)
*B01D 53/26* (2006.01)
(52) U.S. Cl.
CPC ........ *B01D 53/26* (2013.01); *B01D 2252/204* (2013.01); *B01D 2257/504* (2013.01); *B01D 2257/80* (2013.01); *B01D 2259/40088* (2013.01)
(58) Field of Classification Search
CPC .......... B01D 2257/504; B01D 2258/06; B01D 2313/38; B01D 2313/40; B01J 19/00; B01J 2219/00
See application file for complete search history.

(56) References Cited

OTHER PUBLICATIONS

Third Party Observation from PCT/US2020/051269, Filed Sep. 17, 2020, listing the IEAGHG Technical Report, 1 page.
Supplemental Explanation for Third Party Observation from PCT/US2020/051269, Filed Sep. 17, 2020, regarding the IEAGHG Technical Report, 4 pages.
Third Party Observation from PCT/US2021/046716, Filed Aug. 19, 2021, listing the IEAGHG Technical Report, 1 page.
Supplemental Explanation for Third Party Observation from PCT/US2021/046716, Filed Aug. 19, 2021, regarding the IEAGHG Technical Report, 3 pages.

* cited by examiner

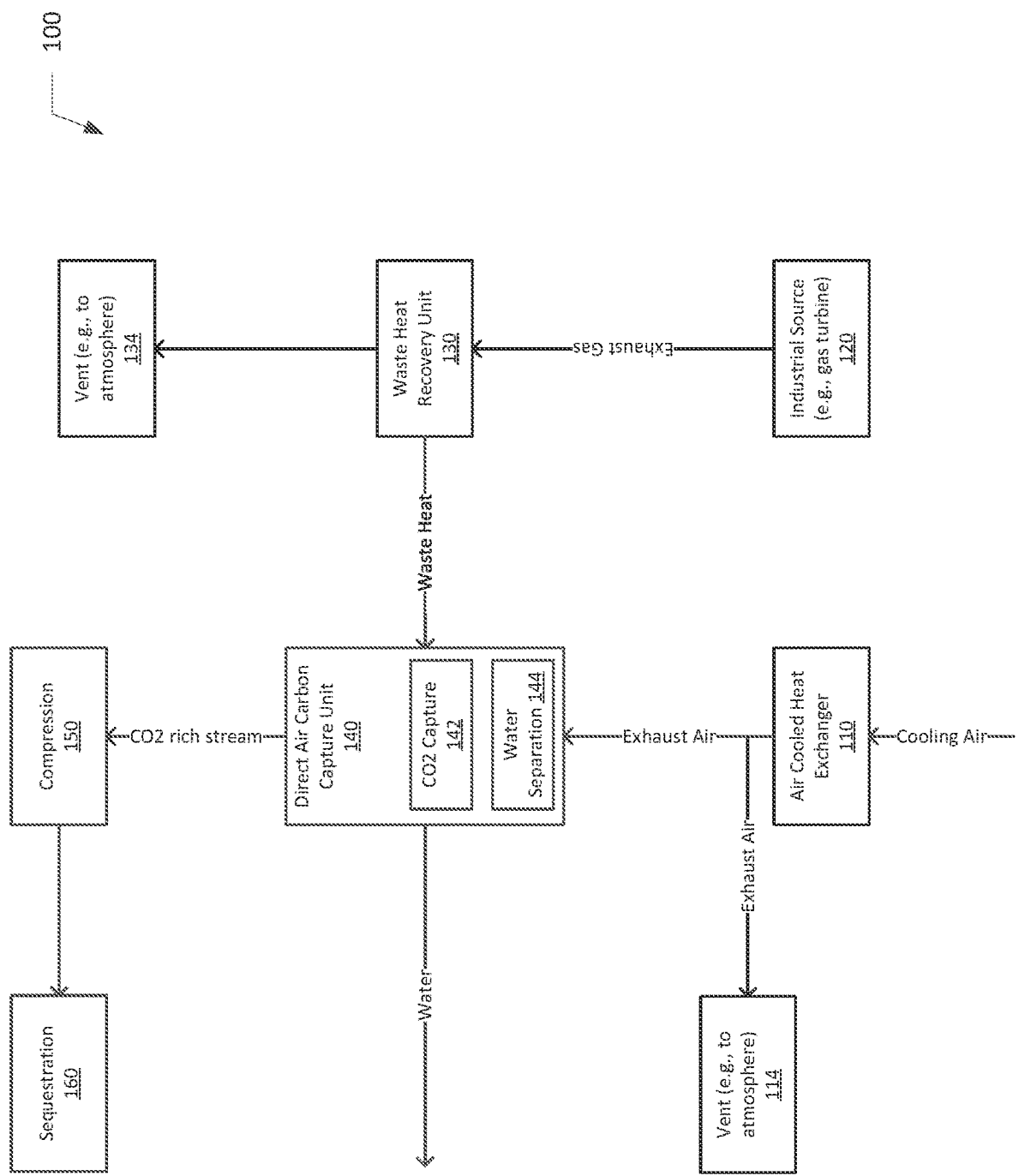

PROCESSES, APPARATUSES, AND SYSTEMS FOR DIRECT AIR CARBON CAPTURE UTILIZING WASTE HEAT AND EXHAUST AIR

CROSS-REFERENCE TO RELATED APPLICATION

This application claims priority from U.S. Prov. App. No. 63/165,491 filed on Mar. 24, 2021, the entirety of which is incorporated herein by reference.

BACKGROUND

Direct air carbon capture (DACC) is a technology that relies on chemical or physical properties of carbon dioxide (CO2) molecules to separate and capture CO2 directly from air in the atmosphere. A DACC system typically captures the CO2 by moving the air toward and/or through a capture device, such as a chemical medium or a membrane. For example, the capture device may include chemicals, such as liquid solvents or solid sorbents, configured to selectively react with and/or otherwise remove CO2 from the air. As another example, the capture device may include a membrane configured to selectively filter CO2 from the air. The DACC system may then apply heat to the capture device to release the captured CO2 and regenerate the capture device.

SUMMARY

According to one non-limiting aspect of the present disclosure, a process may comprise directing a stream of exhaust air of an air cooled heat exchanger into a direct air carbon capture (DACC) unit.

In an example, the process may comprise compressing a product of the DACC unit.

In an example, the process may comprise sending the compressed product to a sequestration site.

In an example, the product of the DACC unit may comprise a carbon dioxide (CO2) rich stream.

In an example, the process may comprise conveying waste heat recovered from an industrial source or other waste heat source to the DACC unit.

In an example, the industrial source may include a combustion product of a gas turbine.

In an example, the process may comprise using the waste heat to regenerate a capture device in the DACC unit.

In an example, the process may comprise removing water from the exhaust air flowing through the DACC.

Additional examples, features, and advantages of the disclosed devices, systems, facilities, and methods are described in, and will be apparent from, the following Detailed Description and the FIGURES. The features and advantages described herein are not all-inclusive and, in particular, many additional features and advantages will be apparent to one of ordinary skill in the art in view of the figures and description. Also, a particular embodiment does not necessarily have all of the advantages listed herein. Moreover, it should be noted that the language used in the specification has been principally selected for readability and instructional purposes, and not to limit the scope of the inventive subject matter.

BRIEF DESCRIPTION OF THE DRAWINGS

FIG. 1 is an exemplary schematic illustration of a system that implements a process of direct air carbon capture using waste heat recovered from an industrial source and a stream of exhaust air flowing from an air cooled heat exchanger, according to example embodiments of the present disclosure.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One of ordinary skill in the art could implement numerous alternate embodiments, which would still fall within the scope of the claims. Unless a term is expressly defined herein using the sentence "As used herein, the term '_____' is hereby defined to mean . . . " or a similar sentence, there is no intent to limit the meaning of that term beyond its plain or ordinary meaning. To the extent that any term is referred to in this patent in a manner consistent with a single meaning, that is done for sake of clarity only, and it is not intended that such claim term be limited to that single meaning. Finally, unless a claim element is defined by reciting the word "means" and a function without the recital of any structure, it is not intended that the scope of any claim element be interpreted based on the application of 35 U.S.C. § 112(f).

Direct air carbon capture (DACC) is generally energy intensive and expensive to implement. The cost of DACC is typically in the range of $200-$400 per ton of captured carbon dioxide (CO2). For example, DACC systems typically expend energy to blow air from their surrounding environment toward and/or through their capture devices (e.g., chemicals or membranes). DACC systems also typically expend energy to regenerate their capture devices, for example, by applying heat to remove the captured CO2 from a CO2 rich liquid solvent or a CO2-enriched membrane. Unlike gases (e.g., flue gas) processed in other carbon capture processes such as post combustion carbon capture, air in the atmosphere typically has a lower temperature, lower pressure, and/or lower concentration of CO2. Therefore, DACC processes typically need to expend more energy per ton of captured CO2 than these other carbon capture processes. In practice, a typical DACC system continuously consumes a large amount of power (usually in the form of electricity from a utility grid) while it is removing CO2 from the ambient air in its environment.

The present disclosure provides novel processes, apparatuses, and systems for direct air carbon capture at a significantly reduced costs, such as costs associated with moving air from the atmosphere to a capture device and/or costs associated with regenerating the capture device.

Referring now to the FIGURES, FIG. 1 is an exemplary schematic illustration of a system 100 that implements a process of direct air carbon capture using waste heat recovered from an industrial source 120 and a stream of exhaust air flowing from an air cooled heat exchanger 110, according to example embodiments of the present disclosure.

Unless otherwise specified herein, the arrows depicted in the FIG. 1 which extend from or to various components may represent a fluid connection or conduit (e.g., piping, etc.) configured to transport a fluid (e.g., flue gas, exhaust air, heating medium, water, CO2 rich stream, etc.) from or to component(s) at end(s) of the respective arrow. Further, an arrow direction of the respective arrow represents a flow direction (e.g., downstream direction) of a fluid flowing inside the conduit represented by the respective arrow. For example, the arrow illustrated between air cooled heat exchanger 110 and direct air carbon capture (DACC) unit 140 may represent a conduit that transports exhaust air flowing from the heat exchanger 110 to the DACC unit 140.

In some examples, the system 100 may be implemented in and/or integrated with an industrial facility, such as a natural gas pipeline, a gas-powered power plant, a manufacturing plant, or any other industrial facility. Many industrial facilities (as well as other non-industrial systems) use air cooled heat exchangers, such as air cooled heat exchanger 110, for cooling processes performed in the industrial facility. Industrial facilities may also include components or sub-systems that produce hot exhaust gases, such as combustion gases of a gas turbine or a fired heater or a combustion engine, which are also normally vented to the atmosphere.

In alternative examples, the system 100 may be implemented independently and connected with a vent of any air cooled heat exchanger 110 (e.g., radiator) and/or a vent of any industrial source 120 (e.g., a combustion gas of a combustion engine, etc.).

In accordance with the present disclosure, an example process of the system 100 involves directing a stream of exhaust air of one or more air cooled heat exchangers 110 into one or more DACC units 140. For example, exhaust air from the air cooled heat exchanger 110 can be used to drive air into a CO2 capture device 142 of the DACC unit 140, before venting it into the atmosphere (which is what systems that use air cooled heat exchangers typically do). Thus, the present disclosure advantageously uses a stream of exhaust air flowing from the heat exchanger 110 to drive the flow of air into the DACC unit 140 instead of implementing separate air compressors, air blowers, etc., in the DACC unit 140 to independently pump air from the atmosphere into the DACC unit 140. The stream of exhaust air flowing from the air cooled heat exchanger 110 may advantageously already be compressed and/or have a suitable flow rate for driving the capture device 142 (e.g., for moving air through a membrane that filters CO2, or moving air to a chemical catalyst or liquid solvent or solid sorbent or other CO2 absorber, etc.).

The stream of exhaust air flowing out of the heat exchanger 110 typically has a higher temperature than ambient air in the environment of the DACC unit. For instance, cooling air flowing into the heat exchanger 110 from the atmosphere may be released as warmer exhaust air after it absorbs heat in the heat exchanger 110. In some examples, the higher temperature of the exhaust air may improve the efficiency and/or increase the throughput of CO2 capture by the capture device 142. For example, some membrane-based capture devices may operate more efficiently if the air being filtered is warmer than the current ambient air temperature. Thus, in these examples, the present disclosure may advantageously improve the performance of such capture device configurations, while also reducing or avoiding costs associated with heating ambient air solely for the purpose of the DACC process.

In some examples, a process of the system 100 may involve selectively venting (e.g., via vent 114) at least a portion of the exhaust air flowing from the air cooled heat exchanger 110 to the atmosphere via a vent 114. For example, the arrow between heat exchanger 110 and vent 114 may represent piping, valves, etc., configured as a bypass for selectively venting the exhaust air (or a portion thereof) to the atmosphere in addition to or instead of directing the exhaust air into the DACC unit 140.

The air cooled heat exchanger 110 may include any type of heat exchanger (e.g., fin-fan heat exchanger, etc.) or cooling system that uses air as a cooling medium. For example, the heat exchanger 110 may include a fan or blower or air compressor arranged to blow ambient air such that the ambient air flows into the heat exchanger as a stream of cooling air and flows out of the heat exchanger (after absorbing heat) as a stream of exhaust air. In some examples, the heat exchanger 110 may include walls, pipes, or any other component arranged or shaped to transport the incoming stream of cooling air to a location of a hot surface (e.g., radiator plate, pipe, or other surface) and then transport the (warmer) cooling air away from the hot surface and out of the heat exchanger 110 as the stream of exhaust air.

Various types of air cooled heat exchangers 110 can be used to provide the stream of exhaust air used to drive the DACC unit 140 of the system 100. In a non-limiting example, the air cooled heat exchanger 110 may include an air-to-gas heat exchanger such as heat exchangers used to cool a flue gas stream in a post combustion carbon capture process. More generally, the air cooled heat exchanger 110 may include any cooling system that uses air as a cooling medium, including cooling systems used in various industrial or non-industrial applications. A non-exhaustive list of example air cooled heat exchangers 110 that can be used with the system 100 includes: lube oil coolers, water coolers, glycol coolers, jacket water coolers, engine radiators, hydraulic oil coolers, compressor coolers (inter or after), belt guard after-coolers, blowers, fans, blower coolers, biogas coolers, landfill gas coolers, soil vapor extraction systems, condensers.

The CO2 capture device 142 of the DACC unit 140 may include any capture device configured to capture CO2 from the exhaust air flowing into the DACC unit 140, based on physical and/or chemical properties of CO2 molecules.

In an example, the capture device 142 includes one or more chemicals, such as catalysts, absorbing media, or adsorbing media, which may be in a gas or liquid or solid form. The one or more chemicals may be configured to selectively react with, dissolve, and/or otherwise separate CO2 from other components of the stream of exhaust air. In one embodiment, the capture device 142 includes a contactor (e.g., gas-liquid contactor, gas-gas contactor, gas-solid contactor, etc.) or any other type of device in which a lean medium (e.g., absorbing or adsorbing medium) is brought into contact with the exhaust air flowing into the DACC unit 140 to capture CO2 from the exhaust air. A non-exhaustive list of example absorbing media includes ammonia, amine based, carbonate based (e.g., potassium carbonate), ionic fluid, and/or any other type of solvent. Thus, prior to contact with the exhaust air, a chemical medium (e.g., solvent) of the capture device 142 may be CO2 or carbon lean. After contact with the exhaust gas, the chemical medium (e.g., solvent) may become CO2 or carbon rich. In other words, after interacting with the exhaust air, the chemical medium of capture device 142 may include a greater amount of carbon.

In an example, the capture device 142 includes a membrane configured to selectively filter or otherwise separate at least a portion of the CO2 in the exhaust air from other gases in the exhaust air. For instance, the membrane of capture device 142 may be configured to selectively permeate CO2. Alternatively, the membrane may be configured to selectively permeate the other gases. To facilitate this, for example, the membrane may be designed (e.g., pore sizing, etc.) to optimize flow resistance of the exhaust air through the membrane as well as the selectivity or permeability of the membrane with respect to certain gases (e.g., CO2) according to the chemical or physical molecular properties of these gases. Various types of membranes can be used to capture CO2 according to a variety of membrane separation mechanisms, such as size sieving (e.g., adjusting the pore size based on the size of a CO2 molecule, etc.), surface diffusion (e.g., membrane material having higher affinity for one particular component of the exhaust air), and/or any other membrane separation mechanism.

The DACC unit 140 may also optionally include or may be coupled to a water separation device 144. The water separation device 144 may include a condenser, a filter, a membrane, or any other medium or device configured to selectively separate water (e.g., water vapor) from other components of the exhaust air flowing into the DACC unit 140 so as to produce liquid water. In an example, the removed liquid water may be transported away from the DACC unit 140 as a stream of liquid water or as any other useable quantity of liquid water. In some examples, a process of the system 100 may also involve using the removed liquid water in a different industrial process at a same or different industrial facility. Alternatively or additionally, the removed water may be processed (e.g., bottled, treated, etc.) and/or sold as a commodity. Thus, the present disclosure may advantageously generate a valuable commodity, as a bi-product of the DACC process, to further offset the cost of the DACC process. In various examples, the water separation device 144 may be configured to remove the water from the exhaust air upstream or downstream of the CO2 capture device 142 (e.g., before or after the stream of exhaust air is transported to the CO2 capture device 142).

As noted above, removing captured CO2 from the capture device 142 (also referred to herein as capture device regeneration) is another contributing factor to the high costs associated with traditional DACC processes. By way of example, in an implementation where the capture device 142 employs an amine-based or other absorbing media to capture CO2, a CO2 lean absorbing media is brought into contact with the exhaust air to absorb CO2. After the absorbing media absorbs the CO2, it becomes a CO2 rich media. To regenerate the CO2 rich absorbing media, the captured CO2 may be removed or stripped by applying heat to the CO2 rich absorbing media to regenerate the CO2 lean absorbing media. In some configurations, the regenerated absorbing media may also be chilled before it is reused in the capture device 142 to capture additional CO2. In this example, the regeneration process including the heating (and optionally chilling) the absorbing media is typically an energy intensive process that requires the use of electricity and/or other fuel source every time the capture device is regenerated.

To reduce or avoid these costs, in accordance with the present disclosure, a process of the system 100 may involve conveying waste heat (e.g., recovered from the industrial source 120) to the DACC unit 140, and using the waste heat to remove the CO2 captured by the capture device 120. By way of example, many industrial facilities, such as manufacturing plants, power plants, liquefied natural gas production facilities, etc., typically vent hot exhaust gases generated (as part of an industrial process in the facility) into the atmosphere (e.g., via vent 134). For example, the waste heat may be recovered (at the waste heat recover unit 130) from a hot exhaust gas (e.g., flue gas, steam, water vapor from an evaporative cooling system, hot air, combustion product of a gas turbine or engine or other combustion fuel powered machine, etc.) generated at one or more industrial sources 120, and conveyed to the DACC unit 140 from the waste heat recovery unit 130 using a heat medium (e.g., steam, oil, etc.) for use in the removal of captured CO2 and/or regeneration of the capture device 142.

Thus, instead of independently generating heat using electricity or some other expensive power source, the present disclosure advantageously uses waste heat, which is typically produced in many types of industrial facilities and other types of machinery, to remove the captured CO2/regenerate the capture device 142/perform any other heating process required to operate the DACC unit 140 (e.g., operating the water separation device 144, etc.).

Although FIG. 1 illustrates the waste heat source 120 as an industrial source (e.g., combustion gas of a gas turbine, etc.), in some examples, the waste heat source 120 may alternatively include other types of non-industrial waste heat sources (e.g., combustion gas from an automobile engine, etc.) releases waste heat (e.g., as a hot exhaust gas vented into the atmosphere, etc.) during its operation.

The waste heat recovery unit 130 is an energy recovery device (e.g., heat exchanger) configured to transfer heat from the exhaust gas flowing from the industrial source 120 to a heat medium (e.g., steam, oil, etc.), which is then transported by the system 100 (e.g., via piping, valves, or other fluid connection) from the waste heat recovery unit 130 to the DACC unit 140.

In the illustrated example, after recovering the waste heat from the exhaust gas of the industrial source(s) 120, the (cooleR) exhaust gas may then be transported out of the waste heat recovery unit 130 and vented to the atmosphere (e.g., via vent 134). Alternatively, in some examples, the exhaust gas flowing out of the waste heat recovery unit 130 (after waste heat recovery) may instead be transported to a different industrial process (e.g., to a post combustion carbon capture process, etc.).

As noted above, the waste heat from the waste heat recovery unit 130 is conveyed to one or more DACC units 140 where it can be used in heating processes such as the regeneration of the capture device 142 and/or the removal of captured CO2. The captured and removed CO2, which may also referred to herein as a product of the capture device 142, may then be sent (e.g., via a conduit) to one or more compressors 150 as a CO2 rich stream. The compressor 150 may compress the CO2 rich gas stream received from the DACC unit 140 for other users or applications, such as for sequestration (e.g., in underground or underwater storage, etc.) or for other industrial uses. In some examples, the compressor 150 is a multi-stage compressor. More generally, the compressor 150 may include any type of gas compressor configured to compress the product of the capture device 142 (i.e., the CO2 rich stream) to produce a compressed product (e.g., compressed CO2).

As noted above, in some examples, the compressed product (i.e., CO2) produced by the compressor 150 may be sent away from the system 100 to a carbon user to a sequestration site 160. In some examples, the compressed CO2 may be sent to an off-site sequestration facility 160, such as an underground geological formation that includes an at least partially depleted hydrocarbon reservoir, or any other sequestration site 160. In an example, the sequestration site 160 may be on top of a seabed (e.g., at a three kilometer depth or greater below sea level, etc.). In another example, the sequestration site 160 is below a seabed.

As used in this specification, including the claims, the term "and/or" is a conjunction that is either inclusive or exclusive. Accordingly, the term "and/or" either signifies the presence of two or more things in a group or signifies that one selection may be made from a group of alternatives.

The many features and advantages of the present disclosure are apparent from the written description, and thus, the appended claims are intended to cover all such features and advantages of the disclosure. Further, since numerous modifications and changes will readily occur to those skilled in the art, the present disclosure is not limited to the exact construction and operation as illustrated and described. Therefore, the described embodiments should be taken as illustrative and not restrictive, and the disclosure should not be limited to the details given herein but should be defined by the following claims and their full scope of equivalents, whether foreseeable or unforeseeable now or in the future.

What is claimed is:

1. A process comprising:
    directing, into a direct air carbon capture (DACC) unit, a stream of exhaust air from an air cooled heat exchanger, wherein the DACC unit includes a capture device configured to capture carbon dioxide (CO2) from the exhaust air flowing through the DACC unit, wherein the capture device includes a membrane configured to selectively filter at least a portion of the CO2 from the exhaust air.

2. The process of claim 1, wherein the capture device includes one or more chemicals configured to selectively separate at least a portion of the CO2 from the exhaust air.

3. The process of claim 2, wherein the one or more chemicals include at least one of a liquid solvent or a solid sorbent.

4. The process of claim 1, further comprising:
    conveying waste heat to the DACC unit; and
    removing, using the waste heat, the CO2 captured by the capture device.

5. The process of claim 4, wherein removing the CO2 captured by the capture device comprises regenerating the capture device.

6. The process of claim 4, further comprising recovering the waste heat from an industrial flue gas.

7. The process of claim 6, wherein the industrial flue gas includes a combustion product of a gas turbine.

8. The process of claim 1, further comprising:
    compressing a product of the capture device, wherein the product of the capture device includes at least a portion of the CO2 captured from the exhaust air.

9. The process of claim 8, wherein the product of the capture device is a CO2 rich stream.

10. The process of claim 8, further comprising sending the compressed product to a sequestration site.

11. The process of claim 1, further comprising:
    removing water from the stream of exhaust air flowing through the DACC unit to produce liquid water.

12. A process comprising:
    recovering waste heat from an industrial flue gas;
    conveying waste heat from the industrial flue gas to a direct air carbon capture (DACC) unit, wherein the DACC unit includes a capture device configured to capture carbon dioxide (CO2) flowing into the DACC unit; and
    removing, using the waste heat, at least a portion of the CO2 captured at the capture device.

13. The process of claim 12, wherein removing the at least portion of the CO2 includes regenerating the capture device.

14. The process of claim 12, wherein the industrial flue gas includes a combustion product of a gas turbine.

15. The process of claim 12, further comprising:
    transporting a stream of exhaust air of an air cooled heat exchanger into the DACC unit, wherein the capture device is configured to capture the CO2 from the stream of exhaust air.

16. The process of claim 12, further comprising:
    compressing a product of the capture device, wherein the product of the capture device includes at least a portion of the CO2 captured from the exhaust air.

17. The process of claim 16, further comprising sending the compressed product to a sequestration site.

18. The process of claim 16, wherein the product of the capture device is a CO2 rich stream.

19. The process of claim 12, further comprising:
    separating water from other gases in the stream of exhaust air flowing through the DACC unit to produce liquid water.

* * * * *